United States Patent [19]

Candy

[11] Patent Number: 4,890,064
[45] Date of Patent: Dec. 26, 1989

[54] METAL DETECTOR SENSING HEAD WITH REDUCED EDDY CURRENT COILS

[75] Inventor: Bruce H. Candy, Adelaide, Australia

[73] Assignee: Minelab Electronic Industries Ltd., Adelaide, Australia

[21] Appl. No.: 97,969

[22] PCT Filed: Nov. 26, 1986

[86] PCT No.: PCT/AU86/00366
§ 371 Date: Jul. 27, 1987
§ 102(e) Date: Jul. 27, 1987

[87] PCT Pub. No.: WO87/03380
PCT Pub. Date: Jun. 4, 1987

[30] Foreign Application Priority Data
Nov. 26, 1985 [AU] Australia .............. PH03573

[51] Int. Cl.⁴ .................. G01V 3/08; G01V 3/10; G01R 33/00
[52] U.S. Cl. .................. 324/329; 324/262
[58] Field of Search .................. 324/326–329, 324/225, 262; 174/114 R, 113 R; 340/870.31

[56] References Cited

U.S. PATENT DOCUMENTS 2,779,908  1/1957  Martin ............... 324/329
4,600,356  7/1986  Bridges et al. ........ 324/329

FOREIGN PATENT DOCUMENTS 1113770  8/1971  Australia .
587038   1/1981  Australia .
748248   3/1982  Australia .
120154  10/1984  European Pat. Off. .

Primary Examiner—Gerard R. Strecker
Assistant Examiner—Walter E. Snow
Attorney, Agent, or Firm—Cushman, Darby & Cushman

[57] ABSTRACT

A sensing head for a metal detector including means for magnetic transmission and detection of a retransmitted signal from a target by means of at least one coil, the head being characterized in that at least some of the conductor material forming the coil and providing for passage of current through the coil is such as to provide for such passage wherein the arrangement is such or the selection of conductor material is such as to restrict the magnitude of eddy currents in the conducting material. Coils wound from wires in parallel, and in particular, Litz wires, are disclosed.

8 Claims, 1 Drawing Sheet

METAL DETECTOR SENSING HEAD WITH REDUCED EDDY CURRENT COILS

BACKGROUND OF THE INVENTION

This invention relates to metal discrimination detection devices.

It is now common art for the remote detection of metal to generate and transmit through a first coil a signal and to detect the magnetic effects of that signal. Conventionally the signal is effected by an alternating current signal which is fed to the transmission coil. Detection electronics then compare a received signal induced in a receiver coil with the transmitted signal.

The induced E.M.F. in the receiver coil will carry information by reason of its phase delay and magnitude, and it is conventional that any such signal is referred to by two quadrature components one of which is the zero phase delay component relative to the transmitted magnetic field (or the "resistive" component) and the other is the quadrature or 90° phase shift component which shall be referred to as the "reactive" component. When a metal detector of this type is being used in conventional circumstances, the head which is conventionally separate from the detection electronics is passed over the ground, and some attempt is usually made to adjust the detection electronics so that the ratio of reactive to resistive components contributed by the ground is used as a zero reference so that any subsequent change in this ratio may be detected, thereby detecting possibly useful target has been detected.

Since the ratio of resistive to reactive components will vary from location to location with different ground types, it is necessary that there be some means by which a detector can be brought to a condition whereby the ground is considered as a zero reference. This is usually achieved by some manually adjustable device such as a potentiometer which controls in the electronic components a phase reference device. Obviously, once the metal detector has been set for that ground to be a zero reference, moving the detector coil across ground in the immediate vicinity would be expected to provide the best sensitivity for detection of appropriate targets which have resistive to reactive ratios different to that of the ground.

The problem to which this invention is directed is that it has been discovered with metal detectors of previous design that ground balancing which is important to achieve best sensitivity especially in soils which have a proportion of magnetic material such as magnetite depends upon not only characteristics of the soil but also factors relating to the relative positioning of the head relative to that soil. In practise with current available detectors optimum ground balancing has been discovered to be a function of the distance between the ground and the sensing head. However, a metal detector will be used over ground which will vary in makeup, and may have randomly located protuberances. Further, the equipment will be carried by persons at a varying heights. This essentially means that if ground balancing is to be kept at an optimum the head should be kept at a uniform height about the ground especially in magnetic soils. As in practice this is not possible in most circumstances, the sensitivity and efficiency in being able to effectively detect an anomoly is severely reduced.

The problem has been to establish just why conventional so called ground balancing cannot yield a response which is independent of the distance between the ground and sensing head in many conditions that might be encountered in practice, especially in the so called magnetic soils. Since magnetic soils are often the host of the valuable target metals such as gold that are being sought, this is a serious deficiency and it is an object of this invention to propose means by which there can be more effective detection and maintenance of ground balancing especially in magnetic soil conditions.

SUMMARY OF THE INVENTION

A first discovery of this invention is that a significant part of the so called ground signal arises from the metal which is within the transmission and receiving coils of the head of the metal detector itself. Such metal would inherently provide a part of the total received signal and it might reasonably be expected that such a signal would maintain a relatively constant resistive and reactive component. The further discovery of this invention is that this is indeed not the case.

After extensive investigation, it was discovered that a significant contributor to this difficulty lay in the fact that intersecting fields with the metal parts and particularly the wires of the coils within a head may intersect with differing direction in a local vicinity of the coils, and such directions can have different effects on different parts of the coil simply because of the total geometry of the location of the coils and the respective fields and their distribution from the ground. The problem with this is that such different directions appear to have a different effect insofar that they may induce a greater or lesser eddy current as compared to the further induced E.M.F. from the ground, hence changing the ratio of resistive to reactive component in total.

The discovery is then that there is a significant difference between a source of magnetic flux from the soil and coil eddy currents that link the open surface of the detecting coil (namely, the geometries are quite different). Hence the ground balance setting is a function of the relative location and orientation of the sensing head with respect to the interrogated magnetic soil, even for ground homogeneous in resistive to reactive ratio.

The invention can accordingly be said to reside in a sensing head for a metal detector including means for magnetic transmission and detection of a retransmitted signal from a target by means of at least one coil, the head being characterised in that at least some of the conductor material forming the coil and providing for passage of current through the coil is such as to provide for such passage, wherein the arrangement is such as to restrict the magnitude of eddy currents in the conducting material.

It is known that the extent of eddy currents for a circular cross-section conductor is approximately proportional to the square of the cross-sectional area of the conductor. In order to achieve best results then, it is preferred that any conducting material within the coil be comprised of wire in which the individual conductors have as small a cross-sectional area as is practicable and that the current carrying capacity of a coil be achieved by providing a sufficient number of such individual conductors operating in parallel following substantially the same path. Each of the conductors should also, of course, be substantially insulated one from the other at least along the substantial length of the path through which they extend.

A type of wire which is referred to in the art as "litz wire" has the characteristics which provide for this substantial resistance to eddy current generation and in so far that it provides a large number of conductors having such a very small cross-sectional area, sufficient current carrying capacity overall nonetheless can be provided for the major detection and transmission requirements of the coil. Insofar that both the transmission and receiving coils can be subject to the influence of fields and insofar that they can then provide eddy currents and indeed retransmission from any part, it is preferred that any coil within the head is comprised of an arrangement adapted to resist eddy current generation.

It is found in practice that incidental metal parts such as faraday screening material generally do not contribute excessive further resistive components through eddy current generation so that provided the substantive conductors (that is, the conductors used for winding of the coils) are characterised by having material resisting eddy current generation, then the significant improvement is achieved.

According to a further form of this invention, a sensing head is provided for a metal detector wherein a total coil eddy current is provided with a effective series resistance which is less than 0.015 ohms per kilohertz when measured with coils subject only to its own generated magnetic field and when the measuring current is at a frequency below 10 kilohertz and is substantially sinusoidal. Furthermore, it is conventional with a metal detector sensing head that a transmitting coil and a receiving coil are located so that in respect of expected detected fields, the two coils are positioned in an effective null location.

DESCRIPTION OF THE PREFERRED EMBODIMENTS

Figure 1:
FIG. 1 is a perspective view of a conventional portable metal detector.

In FIG. 1 the metal detector including an electronic control box 2 and a search head 3 includes both a transmitting and detecting coil located in a relative null relationship.

Figure 2:
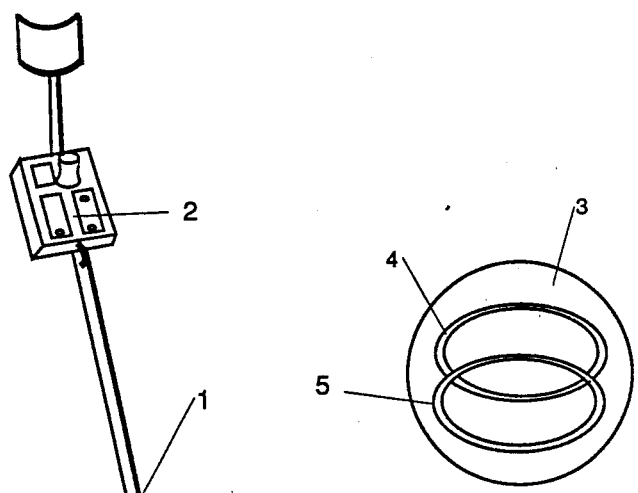
FIG. 2 is an underneath view of the head of the detector as shown in FIG. 1 with a protective coating removed to show the coil layout.

Head 3 as shown in FIG. 2 with the protective outer coating removed includes two coils, a transmission coil 4 and a receiving coil 5 which are located in a relative nulled position.

Figure 3:
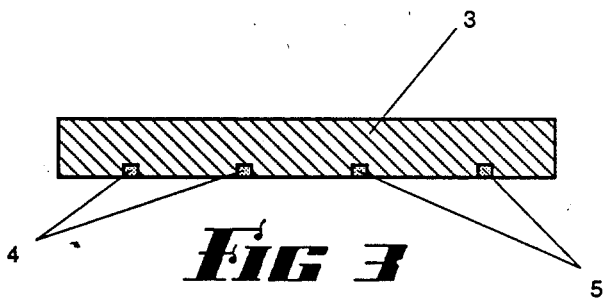
FIG. 3 is a cross-sectional view of the part of the head as shown in FIG. 2.

The cross-sectional view in FIG. 3 shows in slightly more detail the supporting matrix providing support for the coils 4 and 5 which are indeed comprised of a suitable insulation material, and coil 4 being the transmission coil is constituted by being comprised of wire which is indeed litz wire. Coil 5 is a coil of conventional wire.

The preferred embodiment of the invention is a transmitting and sensing head for a discriminating metal detector of the type described in which there is a first transmission coil wound around a former so as to be of a generally cylindrical shape, the wire comprising Litz wire constituted by a plurality of individual strands each of which is of 0.071 mm in diameter and each of which is provided with separate cotton insulation along its full length, the wire, however, having each of the strands electrically joined at the respective ends so that each of the strands provides for electrical conduction in parallel.

The receiver coil is likewise wound from 0.071 mm diameter strand Litz wire around a former so as to be of a generally cylindrical shape, and it is positioned in an overlapping relationship having a parallel planar alignment such that in respect of a field which is generally aligned so as to emanate from targets in the approximate direction of the axis of the respective coils, the several coils are screened in a conventional way by metallic screening materials.

Trials conducted with such a head, using an electronic detection system incorporating a conventional ground balancing adjustment arrangement comprising a potentiometer, provided for a zero ground balancing reference control. Raising or lowering the head relative to such ground did not appear to significantly alter any setting for ground balance. Further, moving the head across the soil in search of targets showed that there was a very significant improvement in the ability for the device to maintain stable ground balance and hence significant improvement in discrimination sensitivity with respect to target metals.

In a further embodiment there is provided a single strand coil in which the diameter of the cross-sectional area is significantly less than that which has been hitherto used. The diameter is indeed now chosen so that there is a series of eddy current resistances in the coil of less than 0.015 ohms per kilohertz for each coil and only in respect of frequencies of less than 10 kilohertz. However, such an approach is significantly less preferred in that there are a number of electronic and manufacturing disadvantages. These include:

(a) Power consumption for a given inductance and drive current is greater than that of coils using thicker wire.

(b) Transmitted magnetic intensity varies as the transmitting coil inductance varies as the sensing head interrogates ground of different effective relative permeability.

(c) Coils using substantially finer wires as a single strand conductor rather than as a multi-strand conductor are significantly less robust.

From investigation and experiments carried out thus far, it is found that an adequate compromise can be achieved provided that the series of eddy current resistance is less than the set 0.015 ohms per kilohertz per coil where the measuring frequency is less than 10 kilohertz so long as the skin depth at these frequencies is at least double the diameter of the wire from which the coil is wound.

The claims defining the invention are as follows:

1. A sensing head for a metal detector, comprising:
means for magnetic transmission of a signal to a target at a measuring frequency; and
means for magnetic detection of a retransmitted signal from said target,
wherein at least one of said magnetic transmission and magnetic detection means has a coil made of a conductor material in which at least some of the conductor material passes current therethrough and in which the respective total equivalent eddy current resistance of each coil is less than 0.015 ohms per kilohertz per coil at said measuring frequency, whereby the magnitude of eddy currents in said conductor material is restricted so as to provide ground balancing substantially independent of the distance between the ground and said sensing head.

2. A sensing head as in claim 1 wherein said at least one coil is comprised of a plurality of conductors made of said conductor material connected so as to provide current conduction therethrough in parallel, said plurality of conductors being separated by electrical insulating means at least along a substantial length of said plurality of conductors to prevent conducting contact therebetween.

3. A sensing head as in claim 2, wherein said plurality of conductors are comprised of multistranded wire in which respective strands are at least substantially insulated with respect to each other along a substantial length of the respective strands.

4. A sensing head as in claim 1, wherein said at least one coil is wound from litz wire having a plurality of individual strands, respective strands of said litz wire providing for parallel conduction of current therethrough.

5. A sensing head as in claim 4, wherein the individual strands of said litz wire have diameters less than 0.1 mm.

6. A sensing head as in claim 1, wherein said magnetic transmission means and said magnetic detection means respectively comprise a transmission coil and a detection coil, said sensing head further comprising means for positioning said transmission coil and detection coil so as to have a substantially parallel axis and an overlapping nulled relationship with respect to fields emanating from the direction of said substantially parallel axis.

7. A sensing head for a metal detector having means for generating an oscillatory electrical signal, comprising:

a magnetic transmission coil responsive to said electrical signal for generating a magnetic field; and
a magnetic detection coil for detecting a reflected magnetic field retransmitted from a target after interaction with the magnetic field generated by said magnetic transmission coil,
wherein at least one of said magnetic transmission and detection coils is formed of a material such that said at least one coil has a total equivalent eddy current resistance of less than 0.015 ohms per kilohertz per coil when said electrical signal has a sinusoidal measuring frequency which is less than 10 kilohertz, the magnitude of eddy currents therein being thereby restricted so as to provide ground balancing substantially independent of the distance between the ground and said sensing head.

8. A method of detecting a metal target in earth using a sensing head, comprising the steps of:
generating an oscillatory electrical signal;
applying said electrical signal to a magnetic transmission coil for generating a magnetic field at a sinusoidal measuring frequency;
detecting with a detection coil a reflected magnetic field retransmitted from a said metal target after interaction with the magnetic field generated by said magnetic transmission coil; and
restricting the magnitude of eddy current in at least one said magnetic transmission and detection coils by forming at least one of said coils of a material having properties wherein respective total equivalent eddy current resistances of said coils are less than 0.015 ohms per kilohertz per coil when said sinusoidal measuring frequency is less than 10 kilohertz, thereby providing ground balancing substantially independent of the distance between the earth and said sensing head.

* * * * *